Figure 1:
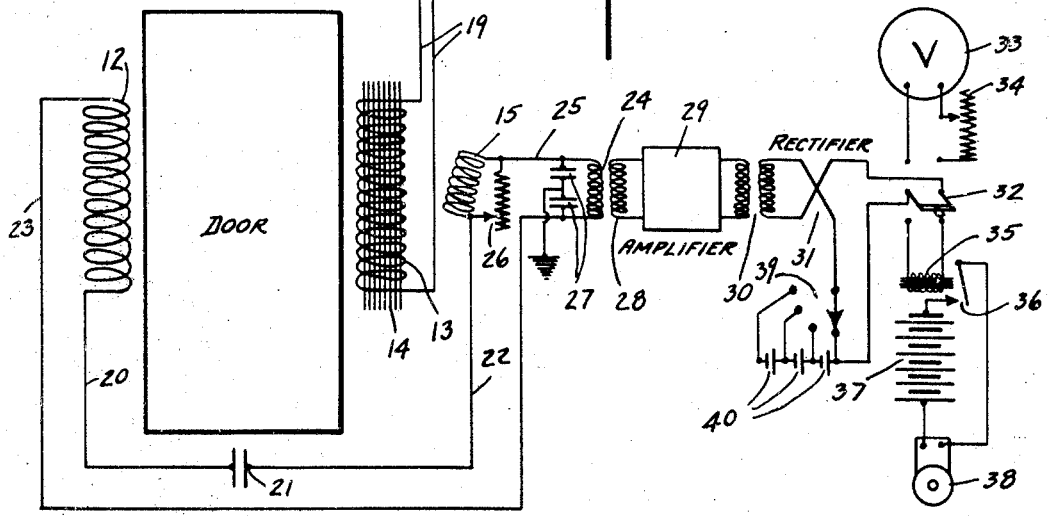

Aug. 28, 1934.　　　A. C. WOODWARD　　　1,971,549
BANDIT ALARM
Filed Feb. 6, 1933

INVENTOR.
ARTHUR C. WOODWARD.
BY
Lockwood Lockwood Goldsmith & Galt
ATTORNEYS.

Patented Aug. 28, 1934

1,971,549

UNITED STATES PATENT OFFICE 1,971,549

BANDIT ALARM

Arthur C. Woodward, Greensburg, Ind.

Application February 6, 1933, Serial No. 655,319

6 Claims. (Cl. 177—311)

This invention relates to a bandit alarm.

The principal object of the invention is to provide apparatus which will give an alarm when firearms, concealed or otherwise, are carried through a doorway, such as the street door of a bank.

The principal characteristic of firearms which distinguishes the same from other objects usually carried on the person is the fact that their principal material is steel, which is a magnetic material. In the present invention, this fact is utilized by providing apparatus sensitive to the presence of magnetic material and placed in such position relative to the doorway that an indication of the presence of magnetic material is produced. By this means, the presence of firearms concealed on the person of an individual passing through the door or carried openly by such individual is indicated immediately, and this indication may be used to sound an alarm within the bank, to operate an alarm of either an audible or visible type at a remote station, such as police headquarters, to automatically trap the individual by locking doors ahead and behind him or to perform any other desired function which may be electrically initiated. Since the apparatus is sensitive only to magnetic material, no indication is produced when other metals than iron, such as coins, brass keys and other such objects usually carried by individuals are taken through the doorway.

The sensitivity to magnetic materials only is secured by the use of a direct magnetic field of such low density that no appreciable eddy currents are produced in a conducting body carried therethrough or by the use of an alternating magnetic field of a similar density with such a low frequency that eddy currents induced thereby in a conducting body present in the field are too small to produce an appreciable distortion of the field. The use of a direct field or of a low frequency alternating field also prevents the production of capacity effects which would distort a field of radio frequencies. For an alternating field a frequency of sixty cycles per second has been found entirely satisfactory.

The principal feature of the invention resides in the provision of a magnet so positioned that it produces a field of magnetic flux of suitable characteristics across the area of the doorway or a certain definite part thereof, together with an induction unit in which an electromotive force may be produced by changes in said magnetic field. The presence of a magnetic material in said field distorts the same in such manner as to change the flux threading the induction unit and thus to alter the electromotive force induced therein and the current produced thereby. The change in this current is utilized by relays or other electrical apparatus to operate an alarm system of any desired type.

The magnet used for producing the magnetic field is preferably an electromagnet, although it is possible to use a permanent magnet. In one embodiment of the invention, a direct current electromagnet or a permanent magnet may be used with a single induction unit in the field thereof. In this embodiment, no electromotive force is induced in the induction units unless a change of flux is produced by the movement of magnetic material in the field. The electromotive force produced by such change may be used to force an electric current through a circuit connected to a suitable alarm device.

In the preferred embodiment of the invention, however, which is illustrated in its simplest form in the present specification, an alternating current electromagnet is used. Two induction units are placed in the field thereof and since the flux is alternating, an electromotive force is constantly induced in each of said units. The two induction units are connected in a circuit adjusted in such manner that the electromotive forces are opposite in phase and thus tend to neutralize each other. The position of one or the other of the induction units in the field is adjustable so that the electromotive force induced therein may be varied until it is equal as well as opposite in phase to that produced in the other unit. Under these conditions, the two electromotive forces exactly neutralize each other and no current can flow in the circuit. A disturbance of the magnetic field produced by the entrance of magnetic material therein increases or decreases the flux threading one or both of the induction units, thus destroying the balance between the electromotive forces induced in said units. Since the electromotive forces are no longer in balance, a current flows in the circuit and may be used to operate any desired alarm device or other electrical device. With this form of the apparatus, a weaker magnetic field may be used to give the same indicating current that would be produced by a stronger magnetic field of the direct current type and it is for this reason that the alternating current type is preferred.

Figure 2:
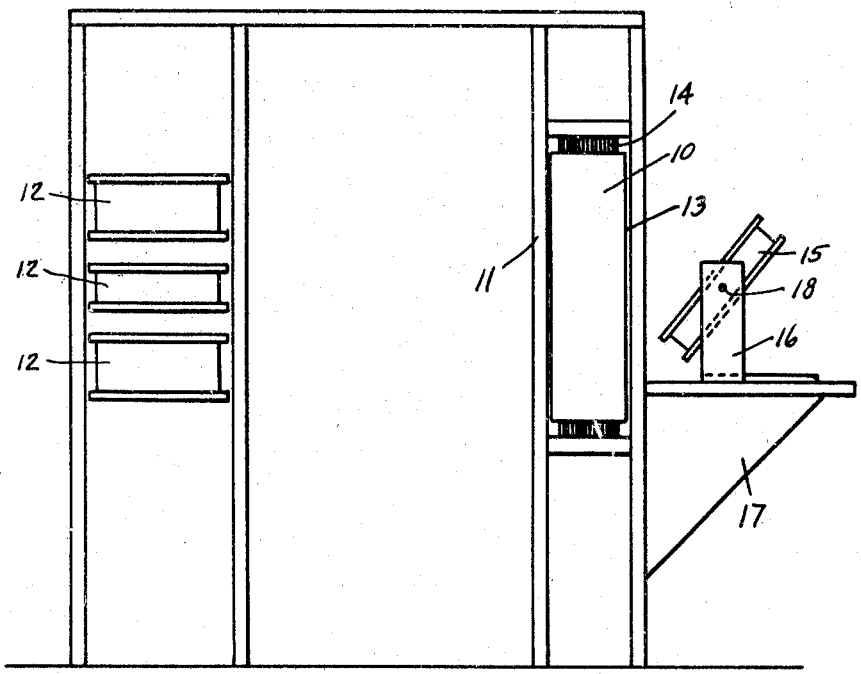

One form of an alternating current embodiment of the invention is described by way of illustration in the following specification and the attached drawing:

Figure 1 is a wiring diagram illustrating the electrical circuits and connections and Figure 2 is an elevational view with parts removed illustrating the position of the various units about a doorway.

In Figure 2, an electromagnet 10 is mounted in a recess at one side of a door frame 11. In a similar recess at the opposite side of the door frame there are shown three coils 12. The magnet 10 consists of a common form of magnet winding 13 wound on a laminated iron core 14. The coils 12 are coaxially positioned with their axes vertical, and are preferably connected in series so that together they constitute a single induction unit which is indicated in Figure 1 by the numeral 12. At the right of the magnet 10 there is mounted a second induction unit in the form of a coil 15 which is carried upon a slidable mounting 16 in turn carried upon a bracket 17. The coil 15 is pivotally mounted on said mounting 16 for movement about a horizontal axis 18 which is transverse to the axis of the winding.

Referring now to Figure 1, the magnet winding 13 is constantly supplied with alternating current by a pair of conductors 19 connected to any suitable source of such current. The most appropriate source, of course, is the lighting supply line of the building, which is usually 110 volt, 60 cycle alternating current. The lower terminal of the "detecting" coil 12 is connected by a conductor 20 to one terminal of a condenser 21, the opposite terminal of which is connected by a conductor 22 to the lower terminal of the "balancing" coil 15. The upper terminal of the winding 12 is connected by a conductor 23 to one of the primary terminals of a transformer 24, the opposite primary terminal of which is connected by a conductor 25 to the upper terminal of the winding 15. A variable resistance unit 26 is shunted across the terminals of the winding 15. A pair of condensers 27 are connected in series and shunted across the terminals of the primary winding of the transformer 24, the mid-points thereof being grounded as shown.

The terminals of the secondary winding 28 of transformer 24 are connected to an amplifier 29 which may be of the usual thermionic type used in radio reception. The output of said amplifier is conducted to the primary winding of a second transformer 30, the secondary winding of which is connected to a rectifier 31 which is preferably of the copper oxide type but which may be any rectifier suitable for the purpose. One output terminal of the rectifier 31 is connected to one of the center points of a double throw, double pole, knife switch 32. The other output terminal of the rectifier is connected to the movable finger of a multiple throw switch 39 having a plurality of dry cells 40 connected across the selective terminals thereof. One of said selective terminals is connected to the second of the center points of the switch 32. One of the pairs of output terminals of said switch is connected to a millivolt meter 33, a variable resistance unit 34 being interposed in one of the connections. The second pair of output terminals of said switch 32 are connected to the magnet coil of a relay 35 which operates when energized to close a pair of normally open contact members 36. One of said contact members is connected to a battery 37 or other suitable source of electric current, and the opposite contactor is connected to an alarm device 38, herein shown as a bell. The opposite terminal of said alarm device is connected to the opposite terminal of the battery 37.

In the operation of the illustrated device, the magnet winding 13 produces an alternating magnetic field of sufficient size to extend completely across the doorway. A part of the flux thereof threads the detector coil 12 and the balancing coil 15. An electromotive force is thus constantly induced in each of said coils. By suitably adjusting the position of the coil 15 as to distance from the magnet 10 and as to angular position with respect thereto, the electromotive force induced in said coil may be made equal to that induced in coil 12. Since the coils 12 and 15 are connected to the conductors 25, 23 and 22 in an opposing relation, an adjustment of the resistance unit 26 may bring the electromotive force at the terminals of coil 15 into a phase relation exactly or nearly exactly opposite to that at coil 12. When this adjustment has been accomplished, no current or a very small current flows in the conductor 23 and the primary winding of the transformer 24.

In making the adjustment, the switch 32 is thrown to connect the millivoltmeter, the resistance 34 is increased to protect the millivoltmeter against excess voltage, and the switch 39 is set in the position shown in the diagram to cut the dry cells 40 out of the circuit. As long as the position of the detector coil 15 and the resistance 26 are not adjusted to give an equal and opposite electromotive force at the terminals of coils 15 and 12, an alternating current flows in the conductor 23 and in the primary winding of the transformer 24. A corresponding current is induced in the secondary winding of said transformer and an amplified current corresponding thereto is delivered by the amplifier to the transformer 30. An electromotive force is induced in the secondary winding of said transformer and, after rectification, is indicated by the millivoltmeter 33. As the adjustment of the coil 15 and the resistance unit 26 is perfected, the amount of the electromotive force registered by the millivoltmeter is decreased and the resistance 34 may be correspondingly reduced to indicate finer and finer degrees of adjustment.

Due to unbalanced conditions in the amplifier and other causes, it is not always possible to reduce the voltmeter reading exactly to zero by adjustment of coil 15 and resister 26. In such cases, the adjustment is carried to as fine a point as possible and is then completed by moving the switch 39 to cut one or more of the dry cells 40 into the output circuit of the rectifier. The said dry cells are connected to oppose the electromotive force at the terminals of the rectifier and so complete the adjustment of the circuits for a zero reading at the voltmeter. When the adjustment has been carried to the point at which no electromotive force is indicated by the voltmeter, the switch 32 is thrown to the relay side, connecting the relay in the output circuit of the rectifier 31.

Thereafter, if an object of iron or steel, such as a firearm, is brought through the doorway between the magnet 10 and coil 12, the magnetic field in the doorway is distorted thereby and the balance of electromotive forces between the two coils 12 and 15 is disturbed. An alternating current then immediately flows in the conductor 23 and the primary winding of the transformer 24. A greatly amplified current is then produced in the relay coil 35 which is adjusted to operate at any desired magnitude of current. Upon the operation of said relay, the circuit is closed for operating the alarm device 38 and the alarm is given.

The purpose of the condensers 27 is to balance the amplifier circuit so that no output will be produced when there is no input to the transformer 24. This can not always be accomplished exactly, hence the necessity in some cases for the dry cells 40 previously described. The purpose of the condenser 21 is to balance out the inductance of the primary circuit to give maximum current in said circuit. Preferably for maximum results, the resistance of the primary winding of the transformer 24 should be equal to that of the remainder of the circuit and the impedance of the secondary winding of the output transformer 30 should be equal to that of the voltmeter and relay. In the windings of the detector coil 12 it is necessary to use many more turns of wire than in the balancing coil 15 to produce the same voltage since the magnetic field is not as strong at the detector coil. However, this is not necessarily true if the positions of the two coils were not as shown in the drawing. Obviously, the detector coil 12 and the balancing coil 15 may be placed at any point in the field of magnet 10 so long as one or the other is in such position that the flux threading therethrough may be disturbed by the presence of magnetic material in the doorway. While I prefer to make the detector coil 12 in three parts as illustrated herein in order to cover as much of the area of the doorway as possible, the same may be made as a single continuous winding if desired, or any number of separate coils connected as desired may be used.

One of the principal advantages of my invention over prior electrical devices for detecting concealed firearms resides in the fact that my invention distinguishes between magnetic materials and non-magnetic materials. While eddy currents may be produced in non-magnetic objects passing through a magnetic field and may disturb the field to some extent, such disturbance in a field of low frequency such as sixty cycles per second is extremely small in comparison with that caused by a magnetic object such as a pistol or revolver. Since the relay 34 may be adjusted to operate on any desired magnitude of current, it may be set to operate only upon the current produced by the presence of a magnetic body and not by the smaller currents produced by eddy currents in non-magnetic bodies. In fact, it is extremely doubtful if the latter class of objects could produce a measureable current at the relay when the proportions of the apparatus are properly chosen for the magnetic class of materials and when a suitable low frequency is used in the field. It is also possible to so adjust the relay that it will not be operated by the presence of such small magnetic objects as an occasional iron or steel key ring or key.

It is obvious that other variations in the exact structure herein disclosed may be made without departing from the scope of the invention as defined by the following claims. For example, currents produced in coils 15 and 12 may be individually amplified or rectified or both and the resulting electromotive forces may be balanced against each other in the same manner as the primary electromotive forces in the form of apparatus illustrated herein.

The invention claimed is:

1. A method of detecting the presence of magnetic material carried through a doorway by a person passing therethrough, including establishing an alternating magnetic field in said doorway, placing a pair of induction elements in said field in such position that substantially equal electromotive forces are normally induced in said elements but unequal electromotive forces are induced therein when said field is disturbed by the presence of extraneous magnetic material therein, connecting said elements in a circuit in which said electromotive forces oppose each other and adjusting one of said elements so that in at least a portion of said circuit current flows only when said electromotive forces are unequal, whereby the presence of magnetic material in said field is indicated by an increase of current flow in said portion of the circuit, said field having alternations of sufficiently low frequency so that no appreciable eddy currents are produced in conducting bodies carried therethrough, whereby no appreciable change in said current is produced by the passage of a non-magnetic conducting body.

2. Apparatus for detecting the presence of magnetic material carried through a doorway by a person passing therethrough, including an electromagnet energized by an alternating electric current having a frequency of the order of sixty cycles per second and positioned to establish an alternating magnetic field in said doorway, a pair of induction elements in said field in such position that electromotive forces induced in at least one of said elements are affected by the presence of magnetic material in said doorway, an electric circuit connecting said elements in differential relation, means for adjusting one of said elements to balance the electromotive forces in said induction elements so that no current flows in at least a portion of said circuit when no extraneous magnetic material is present in said field, and electrical apparatus operable in response to electric currents flowing in said circuit when said balance is disturbed by the presence of such magnetic material.

3. Apparatus for detecting the presence of magnetic material carried through a doorway by a person passing therethrough, including an electromagnet energized by an alternating current having a frequency of the order of sixty cycles per second and positioned at one side of said doorway, said magnet being of sufficient strength to establish an alternating magnetic field across the width of said doorway and beyond, a detector coil positioned in said field at the opposite side of said doorway, a balance coil adjustably positioned in another part of said field, an electric circuit connecting said detector coil and balance coil in differential series relation, a condenser included in said circuit in series with said coils, an adjustable resistance unit shunted across the terminals of said balance coil, a transformer having its primary winding included in said circuit, and electrical apparatus connected to the secondary of said transformer and operable in response to current flowing in the primary thereof.

4. Apparatus for detecting the presence of magnetic material carried through a doorway by a person passing therethrough, including an electromagnet energized by an alternating electric current of the order of sixty cycles per second and positioned to establish an alternating magnetic field in said doorway, a pair of induction elements in said field in such position that electromotive forces induced in at least one of said elements are affected by the presence of magnetic material in said doorway, an electrical device operable when a predetermined electric current is supplied thereto, electric circuits including said device and said induction elements, and means for adjusting the effective E. M. F. delivered to said circuits by one of said induction elements so that insufficient current is supplied to said device to operate the same when no extraneous magnetic material is present in said field but sufficient current to operate the same is supplied thereto when said field is disturbed by the presence of such material therein.

5. Apparatus for detecting the presence of magnetic material carried through a doorway by a person passing therethrough, including an electromagnet energized by an alternating electric current having a frequency of the order of 60 cycles per second and positioned to establish an alternating magnetic field in said doorway, a pair of induction elements in said field in such position that electromotive forces induced in at least one of said elements are affected by the presence of magnetic material in the doorway, an electric circuit connecting said elements in a differential relation, means for adjusting one of said elements to produce a predetermined current flow in said circuit when no extraneous magnetic material is present in said field, and electrical apparatus operable in response to changes in electric currents in said circuit when the field is distorted by the presence of such magnetic material.

6. A method of detecting the presence of magnetic material carried through a doorway by a person passing therethrough, including establishing an alternating magnetic field in said doorway, placing a pair of induction elements in said field in such position that electromotive forces induced in at least one of said elements are affected by the presence of magnetic material in said doorway, connecting said elements in a circuit in which said electromotive forces oppose each other and adjusting one of said elements so that a predetermined current flows in a portion of said circuit when no extraneous magnetic material is present in said field, whereby the presence of such magnetic material in said field is indicated by a change of current flow in said portion of the circuit, said field having alternations of sufficiently low frequency so that no appreciable eddy currents are produced in conducting bodies carried therethrough, whereby no appreciable change in said current is produced by the passage of a non-magnetic conducting body.

ARTHUR C. WOODWARD.